(12) United States Patent
Dobson et al.

(10) Patent No.: US 6,603,811 B1
(45) Date of Patent: Aug. 5, 2003

(54) LOW COMPLEXITY FREQUENCY DOMAIN EQUALIZER HAVING FAST RE-LOCK

(75) Inventors: William Kurt Dobson, Sandy, UT (US); Mark W. Christiansen, Highland, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/087,835

(22) Filed: May 29, 1998

(51) Int. Cl.[7] ................................................. H03H 7/40

(52) U.S. Cl. ........................ 375/232; 375/229; 375/231

(58) Field of Search ................................ 375/229–236, 375/260; 370/480; 333/18, 28 R; 708/300, 322, 323, 400, 403, 404, 405

(56) References Cited

U.S. PATENT DOCUMENTS

| | | | | |
|---|---|---|---|---|
| 3,679,882 A | | 7/1972 | McAuliffe | 235/152 |
| 3,746,989 A | * | 7/1973 | Heim | 375/236 |
| 4,027,257 A | * | 5/1977 | Perreault | 333/18 |
| 4,106,103 A | | 8/1978 | Perreault | 364/827 |
| 4,152,649 A | | 5/1979 | Choquet | 325/42 |
| 4,227,152 A | | 10/1980 | Godard et al. | 375/13 |
| 4,233,589 A | | 11/1980 | Rawson et al. | 340/147 |
| 4,247,908 A | | 1/1981 | Lockhart, Jr. et al. | 364/900 |
| 4,345,250 A | | 8/1982 | Jacobsthal | 340/825.5 |
| 4,430,743 A | | 2/1984 | Watanabe | 333/18 |

(List continued on next page.)

FOREIGN PATENT DOCUMENTS

| | | |
|---|---|---|
| EP | 0 795 977 A2 | 9/1997 |
| EP | 0 795 984 A2 | 9/1997 |
| WO | WO 96/24207 | 8/1996 |

OTHER PUBLICATIONS

Sidhu, I., Grabelsky, D., *A Simple and Efficient Medium Access Layer Protocol for Local Area Networks with Multiple–Priority Traffic*, Advanced Technologies, Carrier Systems Division, 3Com, pp. 1–3.

Van De Beek, J., Edfors, O., Sandell, M., Wilson, S., Borjesson, P., *On Channel Estimation in OFDM Systems*, Division of Signal Processing, Lulea University of Technology, Sweden, Purdue University, School of Engineering, West Lafayette, Indiana, pp. 1–5.

Edfors, O., Sandell, M., Van De Beek, J., Wilson, S., Borjesson, P., *OFDM Channel Estimation by Singular Value Decomposition*, Division of Signal Processing, Lulea University of Technology, Lulea, Sweden, Purdue University, School of Electrical and Computer Engineering, West Lafayette, Indiana, pp. 1–5.

(List continued on next page.)

*Primary Examiner*—Stephen Chin
*Assistant Examiner*—Chieh M. Fan
(74) *Attorney, Agent, or Firm*—McDonnell Boehnen Hulbert & Berghoff

(57) ABSTRACT

A low-complexity frequency domain equalizer having fast re-lock capabilities for use in a DMT transceiver. The transceiver includes a modulator that utilizes DMT modulation methods for communication over the transmission medium, a demodulator for receiving DMT signals, and a channel equalizer that operates in the frequency domain. The equalizer models the channel characteristic as an FIR filter that distorts the signal transmitted over the channel. The channel distortion is removed at the receiver by performing a de-convolution of the channel response via a frequency domain multiplication. After a period of inactivity of the receiver, the equalizer taps are updated by the use of a fast re-lock method so that the previously trained equalizer may be utilized. An undetermined sampling time offset is determined and is used to update the equalizer coefficients such that a full retraining of the equalizer is not required.

3 Claims, 2 Drawing Sheets

U.S. PATENT DOCUMENTS

| | | | |
|---|---|---|---|
| 4,509,206 A | 4/1985 | Carpe et al. ................. | 455/245 |
| 4,519,074 A | 5/1985 | Basile ......................... | 370/124 |
| 4,539,689 A | 9/1985 | Chiu et al. ..................... | 375/13 |
| 4,547,889 A * | 10/1985 | Picchi et al. ................ | 375/235 |
| 4,652,874 A | 3/1987 | Loyer .................... | 340/825.05 |
| 4,745,600 A | 5/1988 | Herman et al. ............... | 370/95 |
| 4,751,701 A | 6/1988 | Roos et al. ................... | 370/85 |
| 4,760,375 A | 7/1988 | Stecker ...................... | 340/310 |
| 4,881,222 A | 11/1989 | Goeckler et al. ............. | 370/70 |
| 4,885,742 A | 12/1989 | Yano ........................ | 370/85.2 |
| 4,885,743 A | 12/1989 | Helbers et al. ............. | 370/85.2 |
| 4,899,217 A | 2/1990 | MacFadyen et al. .......... | 358/86 |
| 4,901,342 A | 2/1990 | Jones ........................... | 379/93 |
| 4,943,980 A | 7/1990 | Dobson et al. .............. | 375/42 |
| 4,959,713 A | 9/1990 | Morotomi et al. .......... | 358/108 |
| 4,965,792 A | 10/1990 | Yano .......................... | 370/85.2 |
| 5,003,579 A | 3/1991 | Jones ........................... | 379/93 |
| 5,051,720 A | 9/1991 | Kittirutsunetorn .......... | 340/310 |
| 5,117,418 A | 5/1992 | Chaffee et al. ............ | 370/32.1 |
| 5,121,414 A | 6/1992 | Levine et al. ................. | 375/96 |
| 5,128,964 A | 7/1992 | Mallory ....................... | 375/39 |
| 5,130,793 A | 7/1992 | Bordry et al. ............... | 358/86 |
| 5,166,924 A | 11/1992 | Moose ...................... | 370/32.1 |
| 5,195,106 A | 3/1993 | Kazecki et al. .............. | 375/12 |
| 5,197,066 A | 3/1993 | Sutterlin .................... | 370/85.3 |
| 5,206,886 A | 4/1993 | Bingham ..................... | 375/97 |
| 5,210,530 A | 5/1993 | Kammerer et al. .... | 340/825.08 |
| 5,226,081 A | 7/1993 | Hinokimoto ................. | 380/34 |
| 5,228,062 A | 7/1993 | Bingham ................... | 375/97 |
| 5,278,844 A | 1/1994 | Murphy et al. ............ | 371/37.1 |
| 5,285,474 A | 2/1994 | Chow et al. .................. | 375/13 |
| 5,313,169 A | 5/1994 | Fouche et al. ............. | 329/302 |
| 5,317,596 A | 5/1994 | Ho et al. .................... | 370/32.1 |
| 5,319,674 A | 6/1994 | Cherubini ................... | 375/101 |
| 5,329,552 A | 7/1994 | De Couasnon et al. ....... | 375/59 |
| 5,353,287 A | 10/1994 | Kuddes et al. ............. | 370/85.2 |
| 5,355,375 A | 10/1994 | Christensen ............... | 370/85.2 |
| 5,377,327 A | 12/1994 | Jain et al. ................... | 395/200 |
| 5,400,322 A | 3/1995 | Hunt et al. ................... | 370/19 |
| 5,410,292 A | 4/1995 | Le Van Suu ........... | 340/310.06 |
| 5,461,640 A | 10/1995 | Gatherer ..................... | 375/231 |
| 5,475,710 A * | 12/1995 | Ishizu et al. ................ | 375/232 |
| 5,479,447 A | 12/1995 | Chow et al. ................... | 375/260 |
| 5,519,727 A | 5/1996 | Okanoue et al. ............ | 375/232 |
| 5,519,731 A | 5/1996 | Cioffi ........................ | 375/260 |
| 5,521,908 A | 5/1996 | Younce et al. ............. | 370/32.1 |
| 5,521,937 A | 5/1996 | Kondo et al. ............... | 375/206 |
| 5,539,777 A | 7/1996 | Grube et al. ................ | 375/316 |
| 5,553,008 A | 9/1996 | Huang et al. ................ | 364/578 |
| 5,568,476 A | 10/1996 | Sherer et al. ................ | 370/60 |
| 5,570,350 A | 10/1996 | Myer et al. .................... | 370/18 |
| 5,572,511 A | 11/1996 | Ouyang et al. ............... | 370/13 |
| 5,572,546 A | 11/1996 | Serfaty et al. ............... | 375/221 |
| 5,592,482 A | 1/1997 | Abraham ....................... | 348/8 |
| 5,596,577 A | 1/1997 | Perreault et al. ............ | 370/449 |
| 5,596,604 A | 1/1997 | Cioffi et al. ................. | 345/260 |
| 5,598,401 A | 1/1997 | Blackwell et al. ............ | 379/94 |
| 5,606,577 A | 2/1997 | Grube et al. ................ | 375/295 |
| 5,608,725 A | 3/1997 | Grube et al. ................ | 370/338 |
| 5,621,662 A | 4/1997 | Humphries et al. ......... | 364/550 |
| 5,625,651 A | 4/1997 | Cioffi ........................ | 375/354 |
| 5,625,871 A | 4/1997 | Myer et al. ................. | 455/33.1 |
| 5,627,828 A | 5/1997 | Lee ............................ | 370/445 |
| 5,627,863 A | 5/1997 | Aslanis et al. ............... | 375/357 |
| 5,636,211 A | 6/1997 | Newlin et al. ............... | 370/465 |
| 5,636,246 A | 6/1997 | Tzannes et al. ............. | 375/260 |
| 5,651,009 A | 7/1997 | Perreault et al. ............ | 370/447 |
| 5,655,140 A | 8/1997 | Haddock ............... | 395/200.76 |
| 5,659,891 A | 8/1997 | Hays et al. .................. | 455/103 |
| 5,668,802 A | 9/1997 | Chalmers et al. ........... | 370/276 |
| 5,671,251 A | 9/1997 | Blackwell et al. .......... | 375/222 |
| 5,673,290 A | 9/1997 | Cioffi ......................... | 375/260 |
| 5,694,395 A | 12/1997 | Myer et al. ................. | 370/480 |
| 5,694,396 A | 12/1997 | Firouzbakht et al. ....... | 370/480 |
| 5,729,570 A | 3/1998 | Magill ....................... | 375/206 |
| 5,809,030 A * | 9/1998 | Mestdagh et al. .......... | 370/480 |
| 5,909,463 A | 6/1999 | Johnson et al. ............. | 375/220 |
| 6,005,893 A | 12/1999 | Hyll ........................... | 375/260 |
| 6,069,899 A | 5/2000 | Foley ......................... | 370/494 |
| 6,097,763 A * | 8/2000 | Djokovic et al. ........... | 375/260 |
| 6,101,182 A | 8/2000 | Sistanizadeh et al. ....... | 370/352 |
| 6,101,216 A | 8/2000 | Henderson et al. ......... | 375/222 |
| 6,130,893 A | 10/2000 | Whittaker et al. .......... | 370/420 |
| 6,154,465 A | 11/2000 | Pickett ....................... | 370/466 |

OTHER PUBLICATIONS

Nilsson, R., Edfors, O., Sandell, M., Borjesson, P., *An Analysis of Two–Dimensional Pilot–Symbol Assisted Modulation for OFDM*, Division of Signal Processing, Lulea University of Technology, Sweden, Department of Applied Electronics, Lund University, Lund, Sweden, Lucent Technologies, Bell Labs., Windmill Hill Business Park, Swindon, UK, pp. 1–4.

Wahlqvist, M., Ostberg, C., Van De Beek, J., Edfors, O., Borjesson, P., *A Conceptual Study of OFDM–Based Multiple Access Schemes, Part 1:Air Interface Requirements*, Lulea University of Technology, Lulea, Sweden, Telia Research, Lulea, Sweden, pp. 1–7.

Van De Beek, J., Edfors, O., Borjesson, P., Wahlqvist, M., Ostberg, C., *A Conceptual Study of OFDM–Based Multiple Access Schemes, Part 2: Channel Estimation in the Uplink*, Lulea University of Technology, Lulea, Sweden, Telia Research, Lulea, Sweden, pp. 1–7.

Van De Beek, J., Edfors, O., Borjesson, P., Wahlqvist, M., Ostberg, C., *A Conceptual Study of OFDM–Based Multiple Access Schemes, Part 3: Performance Evaluation of a Coded System*, Lulea University of Technology, Lulea, Sweden, Telia Research, Lulea, Sweden, pp. 1–6.

Antipolis, Sophia, *A Conceptual Study of OFDM–Based Multiple Access Schemes, Part 4: Tracking of Time and Frequency Offset*, Telia Research, Dec. 1996, pp. 1–12.

Van De Beek, J., Sandell, M., Borjesson, P., *ML Estimation of Timing and Frequency Offset in Multicarrier Systems*, Division of Signal Processing, Lulea University of Technology, Lulea, Sweden, Apr., 1996, pp. 1–24.

Sandell, M., Edfors, O., *A Comparative Stud y of Pilot–Based Channel Estimators for Wireless OFDM*, Sep. 1996, pp. 1–34.

Lulea University of Technology, Division of Signal Processing, *Synchronization in OFDM*, Mar. 27, 1998, pp. 1–3.

Van De Beek, J., Sandell, M., Borjesson, P., *On Synchronization in OFDM Systems Using the Cyclic Prefix*, Division of Signal Processing, Lulea University of Technology, Lulea, Sweden, pp. 1–5.

Van De Beek, J., Sandell, M., Isaksson, M., Borjesson, P., *Low–Complex Frame Synchronization in OFDM Systems*, Division of Signal Processing, Lulea University of Technology, Lulea, Sweden, Telia Research, Lulea, Sweden, pp. 1–5.

Isaksson, Mikael, *Proposal: Option for In–Band POT and ISDN*, Standards Project: T1E1.4:VDSL, Sep. 22–26, 1997, pp. 1–5.

Sandell, M., Van De Beek, J., Borjesson, P., *Timing and Frequency Synchronization in OFDM Systems Using the Cyclic Prefix*, Division of Signal Processing, Lulea University of Technology, Lulea, Sweden, pp. 1–4.

Edfors, O., Sandell, M., Van De Beek, J., Wilson, S., Borjesson, P., *Analysis of DFT–Based Channel Estimators for OFDM*, Vehicular Technology Conference (VTC'96), Chicago, Illinois, Jul. 25–28, 1995, pp. 1–25.

Edfors, O., Sandell, M., Van De Beek, J., Landstrom, D., Sjoberg, F., *An Introduction to Orthogonal Frequency–Division Multiplexing*, Sep. 1996, pp. 1–58.

Edfors, Ove, *Low–Complexity Algorithms in Digital Receivers*, Doctoral Thesis, Lulea University of Technology, Sep. 1996, pp. 1–190.

* cited by examiner-

LOW COMPLEXITY FREQUENCY DOMAIN EQUALIZER HAVING FAST RE-LOCK

BACKGROUND OF THE INVENTION

A. Field of the Invention

The present invention relates to communication transceivers. More particularly, the invention relates to an equalizer having fast re-lock capcabilities. The equalizer is designed to be operated within a DMT transceiver.

B. Description of the Related Art

1. Discrete Multi-Tone Modulation

Discrete Multi-Tone (DMT) uses a large number of subcarriers spaced close together. Each subcarrier is modulated using a type of Quadrature Amplitude Modulation (QAM). Alternative types of modulation include Multiple Phase Shift Keying (MPSK), including BPSK and QPSK, and Differential Phase Shift Keying (DPSK). The data bits are mapped to a series of symbols in the I-Q complex plane, and each symbol is used to modulate the amplitude and phase of one of the multiple tones, or carriers. The symbols are used to specify the magnitude and phase of a subcarrier, where each subcarrier frequency corresponds to the center frequency of the "bin" associated with a Discrete Fourier Transform (DFT). The modulated time-domain signal corresponding to all of the subcarriers can then be generated in parallel by the use of well-known DFT algorithm called Inverse Fast Fourier Transforms (IFFT).

The symbol period is relatively long compared to single carrier systems because the bandwidth available to each carrier is restricted. However, a large number of symbols is transmitted simultaneously, one on each subcarrier. The number of discrete signal points that may be distinguished on a single carrier is a function of the noise level. Thus, the signal set, or constellation, of each subcarrier is determined based on the noise level within the relevant subcarrier frequency band.

Because the symbol time is relatively long and is followed by a guard band, intersymbol interference is a less severe problem than with single carrier, high symbol rate systems. Furthermore, because each carrier has a narrow bandwidth, the channel impulse response is relatively flat across each subcarrier frequency band. The DMT standard for ADSL, ANSI T1.413, specifies 256 subcarriers, each with a 4 kHz bandwidth. Each sub-carrier can be independently modulated from zero to a maximum of 15 bits/sec/Hz. This allows up to 60 kbps per tone. DMT transmission allows modulation and coding techniques to be employed independently for each of the sub-channels.

The sub-channels overlap spectrally, but as a consequence of the orthogonality of the transform, if the distortion in the channel is mild relative to the bandwidth of a sub-channel, the data in each sub-channel can be demodulated with a small amount of interference from the other sub-channels. For high-speed wide-band applications, it is common to use a cyclic-prefix at the beginning, or a periodic extension appended at the end of each symbol to maintain orthogonality. Because of the periodic nature of the FFT, no discontinuity in the time-domain channel is generated between the symbol and the extension. It has been shown that if the channel impulse response is shorter than the length of the periodic extension, sub-channel isolation is achieved.

2. Asymmetric Digital Subscriber Lines

Asymmetric Digital Subscriber Line (ADSL) is a communication system that operates over existing twisted-pair telephone lines between a central office and a residential or business location. It is generally a point-to-point connection between two dedicated devices, as opposed to multi-point, where numerous devices share the same physical medium.

ADSL is asymmetric in that it supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed duplex channel providing bi-directional communication between the subscriber and the service provider/central office. Its rate is also adaptable and the rates range from 16 to 640 kbps. The third information channel is a POTS (Plain Old Telephone Service) channel. The POTS channel is typically not processed directly by the ADSL modems—the POTS channel operates in the standard POTS frequency range and is processed by standard POTS devices after being split from the ADSL signal.

The American National Standards Institute (ANSI) Standard T1.413, the contents of which are incorporated herein by reference, specifies an ADSL standard that is widely followed in the telecommunications industry. The ADSL standard specifies the use of DMT modulation.

SUMMARY OF THE INVENTION

There exists a need for a reduced complexity equalizer capable of removing channel distortion from a DMT signal.

A low-complexity frequency domain equalizer having fast re-lock capabilities for use in a DMT transceiver is provided. The transceiver includes a modulator that utilizes DMT modulation methods for communication over the transmission medium, a demodulator for receiving DMT signals, and a channel equalizer that operates in the frequency domain. The equalizer models the channel characteristic as an FIR filter that distorts the signal transmitted over the channel. The channel distortion is removed at the receiver by performing a de-convolution of the channel response via a frequency domain multiplication. After a period of inactivity of the receiver, the equalizer taps are updated by the use of a fast re-lock method so that the previously trained equalizer may be utilized. An undetermined sampling time offset is determined and is used to update the equalizer coefficients such that a full retraining of the equalizer is not required.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
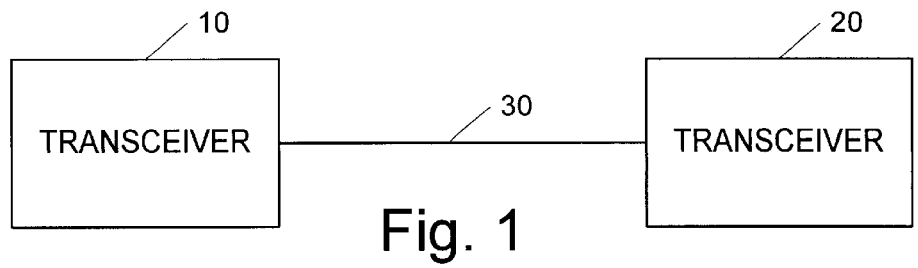
FIG. 1 depicts a preferred embodiment of the communication system.

The transceiver described herein is used in a communication system as shown in FIG. 1, which consists of transceiver 10, transceiver 20, and communication medium 30. One transceiver is located at the subscriber location, typically a residence or business office, and the other is located at a central office location, or service provider location. The communication medium may be a standard land-line connection over twisted pair cable or may be a wireless service between the DMT transceivers. The transceivers 10, 20 are substantially identical and are shown in FIG. 2.

Figure 2:
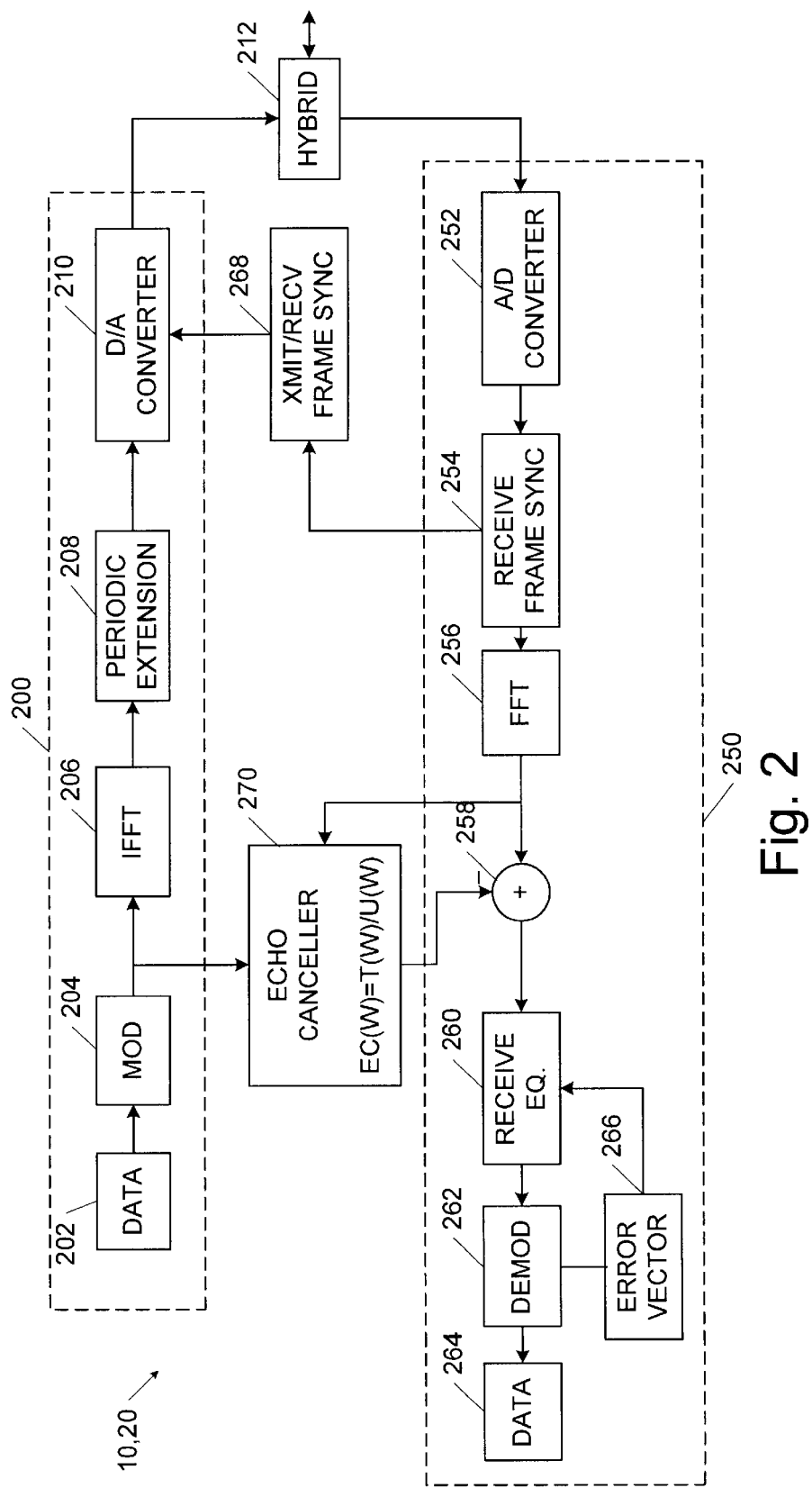
FIG. 2 shows a preferred embodiment of the DMT transceiver.

With reference to FIG. 2, the transceiver of the preferred embodiment includes a transmitter portion 200 and a receiver portion 250. Transceivers 10, 20 use wide-band multi-carrier modulation known as discrete multi-tone (DMT), where each channel is split into a number of sub-channels, each with its own carrier. Preferably the number of carriers is two hundred fifty six, but the transceiver is easily scalable to use additional (or fewer) carriers. The data bits are mapped to frames of complex frequency domain symbols and transformed digitally using a frequency-domain to time-domain transformation on each frame. A discrete Fourier transform (DFT) provides a computationally efficient implementation of such a transformation.

Alternatively, one of many well-known wavelet transformations may be used to generate a modulated time-domain signal. In such a case, the information symbols are modulated onto a family of wavelets where each wavelet occupies a different frequency range. Typically, each wavelet is a time-scaled version of the other wavelets in the family such that the wavelets are orthogonal. Typically, the wavelets also occupy different bandwidths, with, e.g., the longer wavelets occupying the smaller bandwidths at the lower frequency bands, and the shorter wavelets occupying larger bandwidths at the higher frequencies. In this sense, the wavelet transformer also results in a multi-carrier signal similar to a DMT signal, with each wavelet acting as a separate "carrier".

The transmitter 200 of either of the transceivers 10, 20 includes a data source 202 that provides scrambled data to modulator 204. By scrambling the data, source 202 ensures continuous data transitions. In the MOD modulator 204, the data is mapped to signal points chosen from a constellation of complex signal points. The IFFT transformer 206 performs an inverse Fourier transform on the complex points to generate a time-domain sequence. The periodic extension is appended in the periodic extension block 208 to the signal to allow for channel impulse response and to enable receiver symbol timing recovery and clock tracking. The modulator 204 or the IFFT transformer 206 also scales the amplitude of the digital signal according to the range of the D/A converter 210, and the data is sent through the hybrid 212 across the channel 30 to the receiver portion 250 of the distant transceiver.

The data source 202 scrambles the data to de-correlate it such that the energy of the time-domain transmit signal is spread evenly across the spectrum. This also ensures a proper peak-to-average signal. A suitable scrambler algorithm is that used in the V.series modems, specifically ITU Recommendation V.34. The performance and complexity of this algorithm are well known, and code exists for its implementation on common DSP platforms. Alternatively, a block based scrambler using a lookup table may be used.

The MOD modulator block 204 maps input data to complex points in a signal constellation for each sub-channel. One of a number of modulation techniques may be used. Quadrature Amplitude Modulation (QAM), Multiple Phase Shift Keying (MPSK) (including QPSK), Differential Phase Shift Keying (DPSK) (including DQPSK) and the like, are all possible modulation schemes. DQPSK is presently preferred. The data is mapped as a phase transition. At the receiver the phase of each carrier is compared to its previous phase from symbol to symbol. This has the advantage of resolving phase ambiguities between the transmitter and receiver.

In the presently preferred embodiment, modulator 406 is a 256 tone DMT modulator, based on a 512 point IFFT. The analog bandwidth of the signal will depend upon the D/A conversion rate used in the particular implementation. The sample rate may be, e.g., 16 MHz, and in accordance with the well-known Nyquist sampling theorem, this implies that the total possible usable bandwidth is the range from 0–8 MHz. Alternatively, a subset of the 256 carriers across the 8 MHz bandwidth may be used by specifying a magnitude of zero for any carriers not used.

To generate a real-valued time-domain signal using an inverse DFT, a 512 point Inverse Fast Fourier Transform (IFFT) is performed, where the last 256 points are reverse-ordered complex conjugates of the first 256 points. It is a well-known property of discrete Fourier transforms that real-valued time domain signals have conjugate-symmetric Fourier transforms.

Voice-band frequency content may be eliminated in the modulated signal by setting the frequency bins corresponding to the voice-band to zero. The modulated DMT signal would therefore not interfere with POTS devices operating over the same channel. Similarly, the frequency bins corresponding to any other data services present on the LAN medium may be set to zero.

The formula for the IFFT inverse transform is:

$$d_j = \frac{1}{\sqrt{n}} \sum_{k=1}^{n-1} w_k e^{-2\pi i (\frac{j}{n})k},$$

for $0 \leq j < 512$, where the $d_j$ are the time domain data points, n is the length of the IFFT, $w_k$ are the complex-valued symbols, and $i = \sqrt{-1}$. The $w_k$ are set to a zero value for bins corresponding to frequencies that are not used. The above summation begins at k=1 because $w_0$ is preferably zero.

The periodic extension or prefix is appended in block 208. The periodic extension, or cyclic extension as it is often referred to, is a repetition of the beginning samples of the time-domain signal generated by the DFT and is appended to the time-domain signal. One of ordinary skill will recognize that a periodic or cyclic prefix is an equivalent to the periodic extension. The length of the periodic extension is preferably at least as long as the impulse response of the channel between the transmitter of transceiver 10 and receiver of transceiver 20. The model of the channel impulse response includes echoes from unterminated wiring segments that may be present within the medium 30 (e.g., in a business or residential environment having numerous wiring runs). The length of the periodic extension is computed based on the worst-case channel impulse response time, the worst case expected reflected echo tails, and the expected symbol (frame) timing error encountered at the receiver. The periodic extension must also be long enough to accommodate echo cancellation. The transmit signal from transceiver 10 is received by its own receiver, together with many echoes of the transmit signal, which appear as overlapping, scaled, and time-shifted versions of the transmit signal.

Once the time-domain transmit signal is generated for the current frame of data, the D/A converter 210 transmits it to hybrid 212 for transmission over the duplex communication link. The receiver 250 of FIG. 2 receives signals from the distant end as well as echoes of any signals transmitted by its own transmitter 200. Echoes are ignored if the transceiver is operating in a half-duplex mode, where the transmitters take turns transmitting over the channel.

In normal operation the receiver must first obtain frame synchronization. Receive frame synchronizer 254 performs this function by the use of a correlator to detect the repetitive samples of the periodic extension. Alternatively, a frame synchronization method using pilot tones may be used. In such a scheme the phases of two adjacent pilot tones transmitted in the first frame are compared to determine the frame index. Because a sampling offset results in a progressive phase offset from bin to bin of a DFT, an examination of the extent of the phase offset between two known symbols will yield the sampling offset, and thus the frame index. The cyclic prefix is removed (or in the case where an extension is used, the beginning of the frame is replaced with the extension), and the data samples representing the data circularly convolved with the channel are sent to transformer 256.

Transformer 256 then performs a transform of the real valued time domain signal and generates a complex frequency domain signal. The first frame contains known data and is used to determine the equalizer coefficients in the equalizer 260. Equalizer 260 processes subsequent blocks of received data using these coefficients and updates the coefficients based on an error signal generated by error vector calculator 266.

Transformer 256 operates on the synchronized time-domain data to generate the frequency domain spectrum. The Fourier transform used within block 256 takes the real valued time-domain receive samples that have been properly framed and produces an output consisting of complex values containing real and imaginary components. The function used is equivalent to:

$$w_j = \frac{1}{\sqrt{n}} \sum_{k=1}^{n-1} d_k e^{-2\pi i \left(\frac{k}{n}\right) j},$$

for $0 \leq j < n$, where the $d_k$ are the time domain data points, n is the length of the FFT, $w_j$ are the complex-valued symbols, and $i=\sqrt{-1}$.

The transformed frequency domain data represents the magnitude and phase of the carriers. The FFT points are commonly referred to as "frequency bins." The length of the output will contain half as many points as the real valued time-domain receive signal because only the first half of the points are calculated. As stated previously, the other half of the frequency domain points are merely complex conjugates of the desired points, and are therefore not needed.

The data is then equalized in block 260 and demodulated in block 262. The equalizer 260 is a frequency domain complex equalizer that simultaneously solves the problems of symbol timing error, clock error and drift, channel phase and attenuation distortion, and removes any number of echoes caused by reflections of unterminated wiring segments. This is accomplished in one mathematical step of low complexity.

The transmitted data may be arranged in packets, with each packet consisting of a limited number of concatenated frames transmitted in serial fashion, or may be arranged as a continuous stream of frames. In either case, the initial frame is an equalization frame of known symbols that is used to provide a coarse estimate of the channel. The receiver's equalizer 260 is trained to the channel using this frame by forming the ratio of the expected symbol to the received symbol for each frequency bin within the frame. The ratios for each tap of equalizer 260 are formed using the complex-valued frequency domain values of the received signal passed through the channel. Those values are readily available from the FFT block 256. The result is a sequence of points (e.g., a vector) where each point corresponds to a frequency bin, and each value is an estimate of the inverse of the channel response at that frequency.

Multiplication of the output of FFT module 256 by the equalizer taps results in a circular de-convolution of the channel impulse response. The circular de-convolution is made possible by the periodic extension, which makes the receive data to appear as if it had been circularly convolved by the channel impulse response. Thus the single step of multiplying the transformed data frames by the equalizer coefficients prior to demodulation corrects for channel impulse response distortion, sampling offset, clock/timing error, etc.

A decision feedback loop is used after the demodulator 262 to generate an error vector in block 266 that is used to update the equalizer taps after each frame is processed. Block 266 allows the equalizer to track slow changes in the channel and to track clock error between the transmitter and receiver.

The demodulator block 262 takes the complex frequency domain points for each bin after equalization, then demodulates those points back to real data. Demodulator 262 includes data slicers to determine the nearest constellation point to the received (and equalized) point. The demodulator may include a trellis decoder and other forward error correcting decoders. Data module 264 reverses the scrambling performed by the transmitter section based on the V.34 scrambler, or a block-based lookup table.

In the full-duplex transceiver, the transmit echo is removed in a manner similar to the way channel distortion is removed from the received signal. Echo cancellation is discussed copending application Ser. No. 09/087,001 entitled "A Low Complexity Frequency Domain Echo Canceller For DMT Transceivers" filed May 29, 1998, the contents of which are hereby incorporated herein by reference.

The transceiver may operate in a continuous streaming mode or in a burst or packet mode. If the data stream is not continuous (whether in full or half duplex), the equalizer taps must be updated when an initial frame is received. Retraining an equalizer typically involves the transmission of numerous frames of a pseudo-random training sequence, followed by continued training using an adaptive decision-based algorithm while the receiver is in operation. Specifically, the taps of the equalizer may updated during normal operation by taking a weighted average of the existing tap values and the taps generated for the current frame based on the errors formed by comparing the decisions and the frequency domain representation of the actual received signal.

The method described herein allows retraining of the receive equalizer after a period of inactivity in the receiver. The receiver inactivity may be due to a quiet time in a packet-based full-duplex transceiver implementation or after a period of transmitting on a half-duplex circuit.

The equalizer coefficients are trained to the channel, however, due to an ambiguity in the sampling time after the period of inactivity, the equalizer coefficients no longer fully compensate for the effects of the channel. The offset in the sample timing results in a progressive linear rotation of the channel characteristic from bin to bin. Therefore the previous equalizer coefficients may be updated by the following method: the first frame after a period of inactivity, i.e., the first frame of a new packet, contains known symbols. The frame is received and converted to the frequency domain as described above, and equalized using the previous equalizer coefficients. The result is then compared to the known symbols, and the taps are updated accordingly. In particular, the ratio of the equalized symbol to the known symbol is formed for each bin, or carrier. The ratios represent the phase rotations that must be incorporated into each corresponding new equalizer tap. Each tap may be multiplied by the corresponding ratio. Preferably however, an average rotation is calculated. Because the rotation in each bin represents a noisy estimate of the rotation in that bin, and the phase rotations are all interrelated, an averaging process will tend to reduce the noise of the estimate. The following equation may be used to obtain the estimate:

$$\theta_{offset} = \frac{1}{B}\sum \frac{\theta_i}{i},$$

where B is the number of bins used to calculate the average, $\theta_j$ is the phase error in bin i. As evident from the above equation, the phase rotations are interrelated in that they linearly progress from bin-to-bin by an elemental phase rotation, $\theta_{offset}$.

Equalizer 260 processes the first frame of update symbols for each frequency bin to update the multiplicative correction factors for each bin by examining the phase offset. Within each bin of the first frame, the phase error $\theta_i$ is a noisy measurement of the actual timing offset. To obtain a better estimate, the equalizer 260 calculates an estimate of $\theta_{offset}$ from each bin and then averages the phase errors over the frame.

The equalizer taps are then updated by rotating them according to the phase offset estimate, i.e., the first tap is multiplied by the complex value $1\angle\theta_{offset}$. The second tap is updated by multiplying it by $1\angle 2\theta_{offset}$, the third by $1\angle 3\theta_{offset}$, etc. The remainder of the packet frames may then be processed using the updated frequency domain equalizer. The equalizer may continue to be updated during the remainder of the packet using the decision directed feedback as described above.

Figure 3:
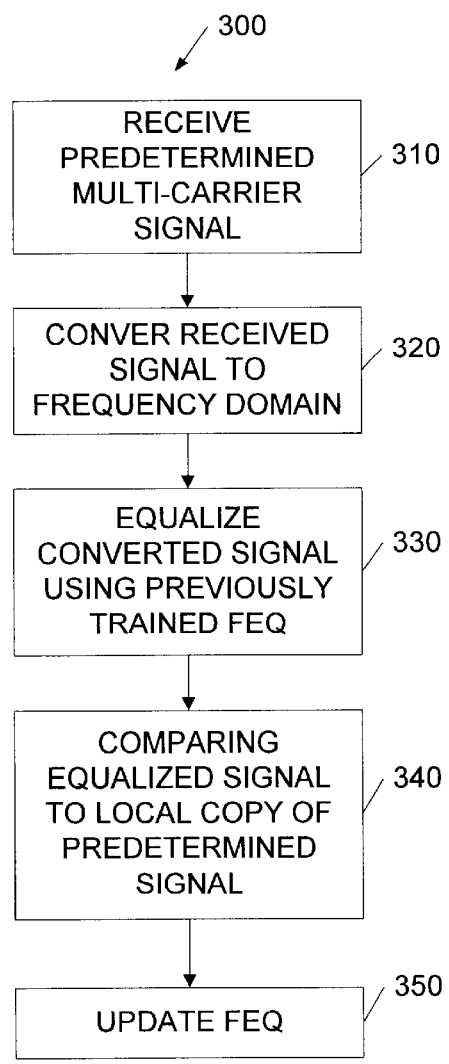
FIG. 3 shows a flowchart of the equalizer re-lock method.

The method of equalization re-lock 300 is shown in the flowchart of FIG. 3. At step 310 the training sequence, a predetermined multi-carrier signal, is received. The signal has been distorted by the channel. The received signal is converted to the frequency domain, typically by a Fourier transform such as an FFT, at step 320. The converted signal is equalized with the taps of the previously trained frequency domain equalizer at step 330. At step 340 the phase rotation associated with the sampling offset is determined by comparing the equalized signal to a local copy of the predetermined signal. The local copy of course is specified in the frequency domain and need not be converted. Finally, the equalizer is updated using the comparison in step 350.

A preferred embodiment of the present invention has been described herein. It is to be understood, of course, that changes and modifications may be made in the embodiment without departing from the true scope of the present invention, as defined by the appended claims.

We claim:

1. A frequency domain equalization re-lock method for use in a DMT transceiver, where the equalizer has been previously trained to the channel, comprising the steps:

receiving a predetermined multi-carrier signal that includes channel distortion;

converting the received signal to the frequency domain;

equalizing the converted signal using the previously trained frequency domain equalizer;

comparing the equalized signal to a local copy of the frequency domain representation of the predetermined signal; and updating the equalizer in response to the comparison wherein the step of comparing the equalized signal to a local copy of the frequency domain representation of the predetermined signal includes forming the ratio of the equalized symbols to the known symbols on a bin-by-bin basis, and wherein the step of updating the equalizer in response to the comparison including multiplying the taps of the previously trained equalizer by the ratio.

2. A frequency domain equalization re-lock method for use in a DMT transceiver, where the equalizer has been previously trained to the channel, comprising the steps:

receiving a predetermined multi-carrier signal that includes channel distortion;

converting the received signal to the frequency domain;

equalizing the converted signal using the previously trained frequency domain equalizer;

comparing the equalized signal to a local copy of the frequency domain representation of the predetermined signal;

updating the equalizer in response to the comparison; and determining an average elemental phase rotation, wherein the step of comparing the equalized signal to a local copy of the frequency domain representation of the predetermined signal includes forming the ratio of the equalized symbols to the known symbols on a bin-by-bin basis.

3. The frequency domain equalization re-lock method of claim 2, wherein the step of updating the equalizer in response to the comparison includes multiplying the taps of the previously trained equalizer by linear multiples of the elemental phase rotation.

* * * * *